United States Patent [19]

Hagino et al.

[11] Patent Number: 5,781,656
[45] Date of Patent: Jul. 14, 1998

[54] METHOD AND APPARATUS FOR INSPECTING PATTERNS COMPOSED OF RETICLE DATA

[75] Inventors: Ichiro Hagino; Katsuji Tabara, both of Kawasaki, Japan

[73] Assignee: Fujitsu Limited, Kawasaki, Japan

[21] Appl. No.: 405,864

[22] Filed: Mar. 17, 1995

[30] Foreign Application Priority Data

Mar. 18, 1994 [JP] Japan .................................. 6-048939

[51] Int. Cl.⁶ .................................................. G06K 9/00
[52] U.S. Cl. .......................... 382/144; 382/147; 382/145
[58] Field of Search .................................. 382/144, 145, 382/147, 148, 149, 151, 190, 217, 219, 222; 356/237, 394; 348/126; 250/492.2

[56] References Cited

U.S. PATENT DOCUMENTS 5,046,109  9/1991  Fujimori et al. ........................ 382/144

*Primary Examiner*—David K. Moore
*Assistant Examiner*—Wenpeng Chen
*Attorney, Agent, or Firm*—Staas & Halsey

[57] ABSTRACT

A method and apparatus for inspecting patterns of reticle data includes carrying out a sizing process in which source data for designing a given device are combined with each other; carrying out a slit filling process in which any slit, that may occur in patterns obtained by the sizing process and is unconformable to a predetermined rule, is deleted by enlarging and reducing patterns; separately storing patterns obtained by the sizing process and patterns obtained by the slit filing process; carrying out a logical operation for patterns obtained by the sizing process and patterns obtained by the slit filling process; storing patterns obtained by logical operation as graphic patterns; detecting patterns each having dimensions equal to or smaller than the predetermined value on the basis of coordinates of the graphic patterns; and deeming the thus detected patterns to be false defect patterns and distinguishing false defect patterns from true defect patterns.

8 Claims, 11 Drawing Sheets

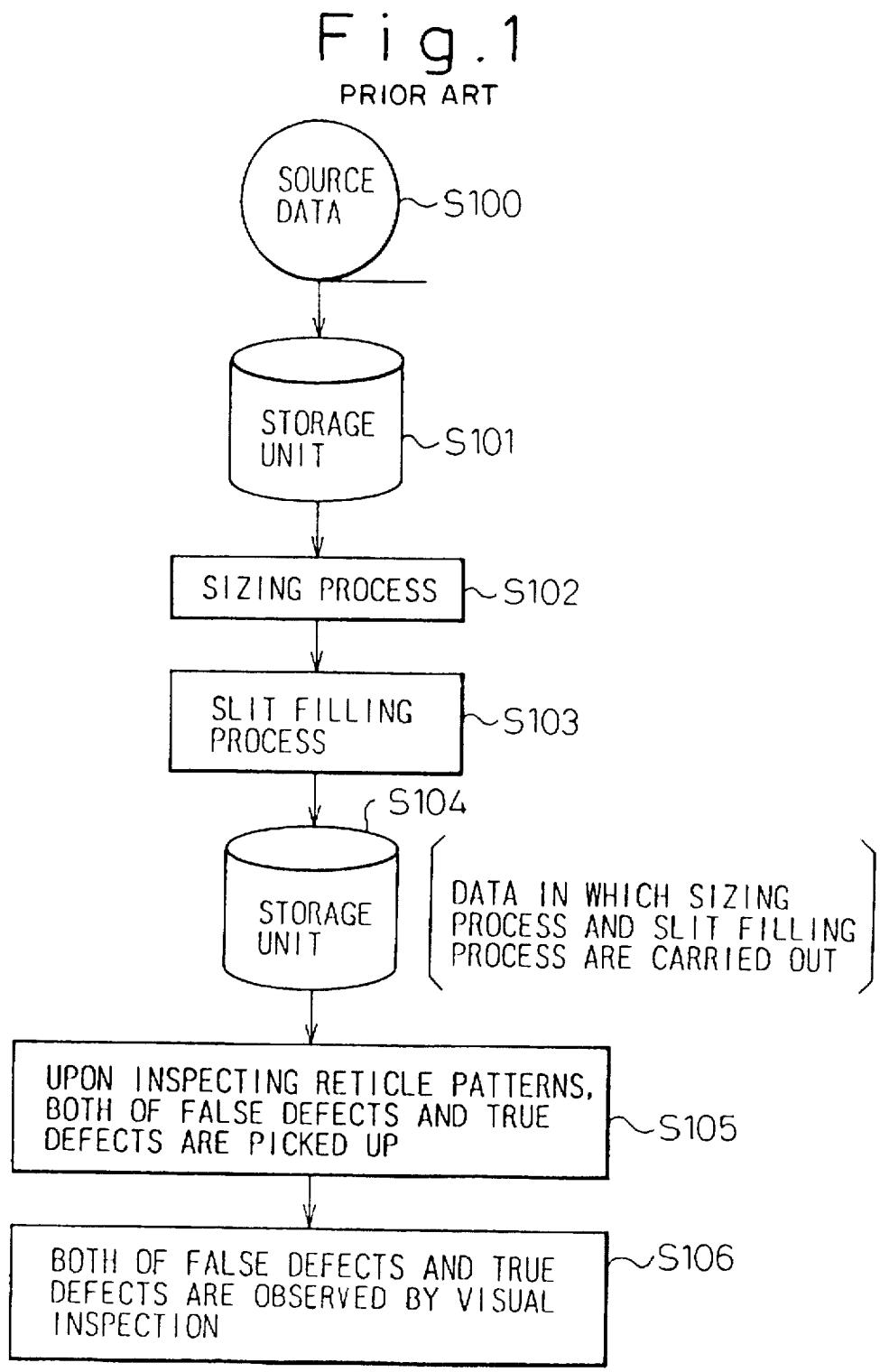

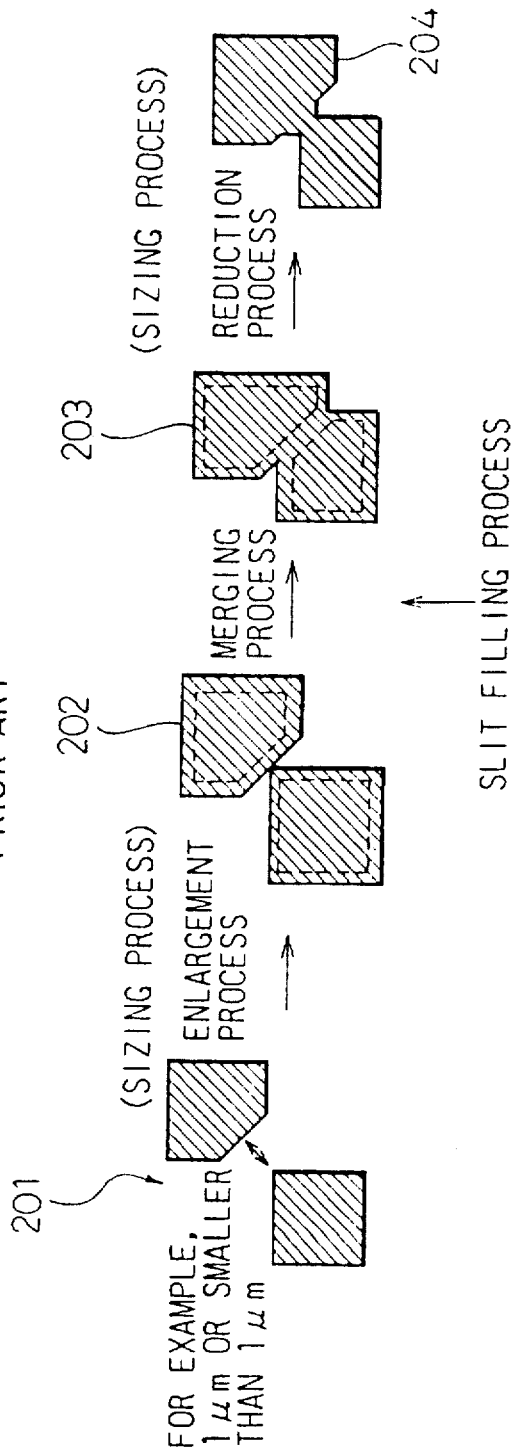

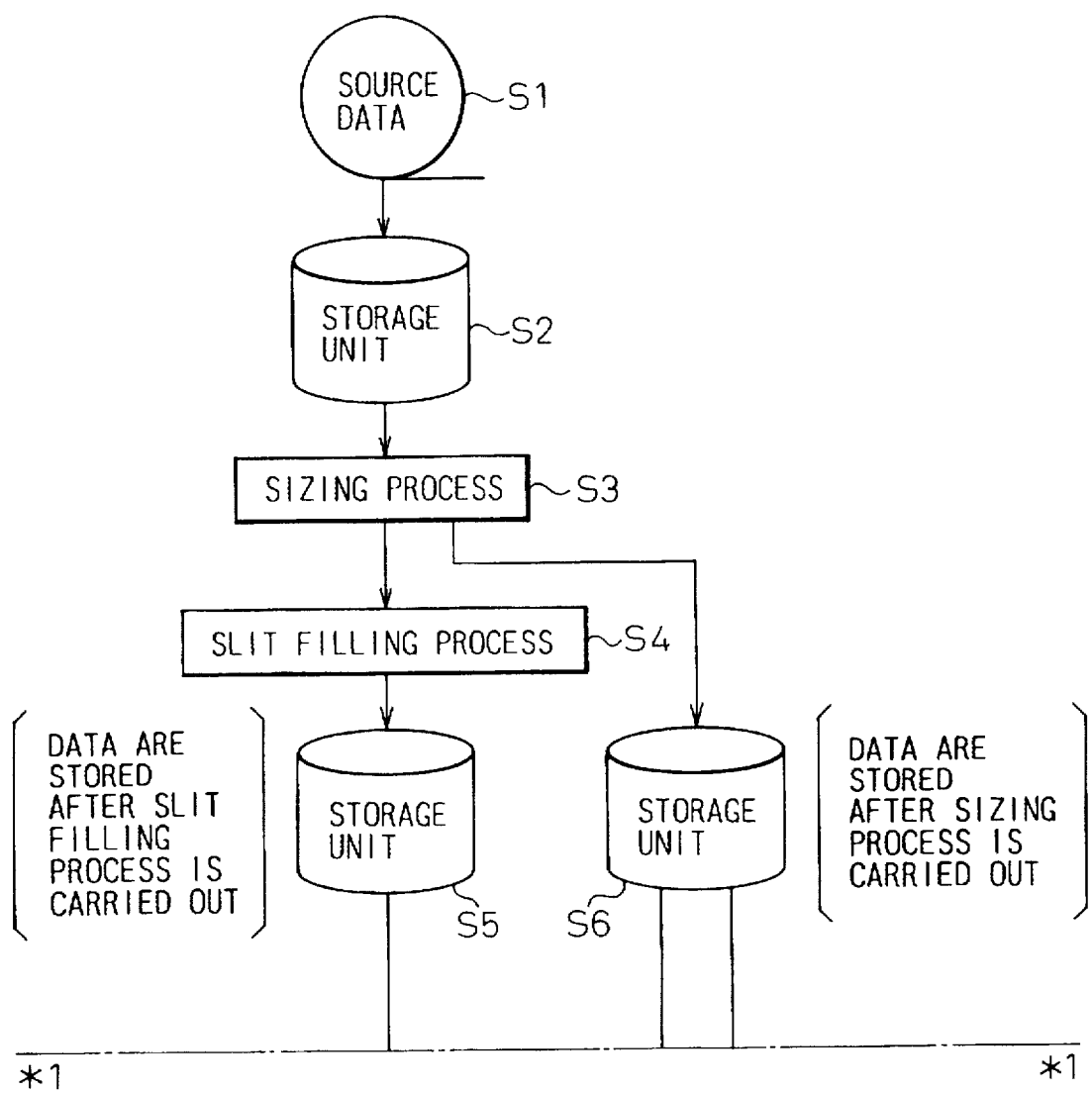

Fig. 9

COORDINATES OF GRAPHIC PATTERN
CORRESPONDING TO FALSE DEFECT $A(x_1, y_1)$
$B(x_2, y_2)$
$C(x_3, y_3)$
$D(x_4, y_4)$
$E(x_5, y_5)$

① $A-B = (x_1, y_1) - (x_2, y_2) = (0, y_1-y_2)$ IF $y_1-y_2 \leq 1\mu m$, PATTERN PC IS INDEFECTIVE PATTERN
    ($y_1-y_2$ : ABSOLUTE VALUE)

② $B-C = (x_2, y_2) - (x_3, y_3) = (x_2-x_3, 0)$ IF $x_2-x_3 \leq 1\mu m$, PATTERN PC IS INDEFECTIVE PATTERN
    ($x_2-x_3$ : ABSOLUTE VALUE)

③ $D-C = \sqrt{(y_4-y_3)^2 + (x_3-x_4)^2} = X$ IF $X \leq 1\mu m$, PATTERN PC IS INDEFECTICE PATTERN
    (X : ABSOLUTE VALUE)

④ $D-E = (x_4, y_4) - (x_5, y_5) = (0, y_4-y_5)$ IF $y_4-y_5 \leq 1\mu m$, PATTERN PC IS INDEFECTIVE PATTERN
    ($y_4-y_5$ : ABSOLUTE VALUE)

⑤ $E-A = (x_5, y_5) - (x_1, y_1) = (x_5-x_1, 0)$ IF $x_5-x_1 \leq 1\mu m$, PATTERN PC IS INDEFECTIVE PATTERN
    ($x_5-x_1$ : ABSOLUTE VALUE)

(ARBITRARY VALUE MAY BE USED, IN PLACE OF THE ABOVE-MENTIONED VALUE OF $1\mu m$)

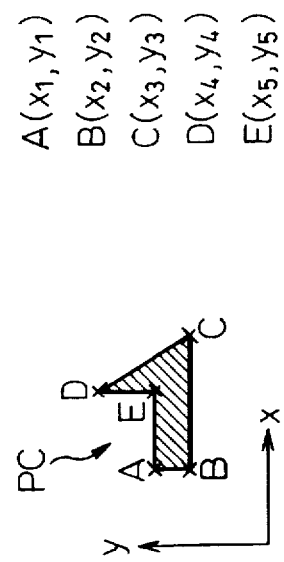
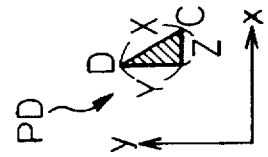

Fig. 10

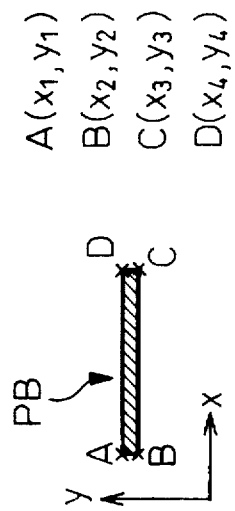

A($x_1, y_1$)
B($x_2, y_2$)
C($x_3, y_3$)
D($x_4, y_4$)

⑥ A−B=($x_1, y_1$)−($x_2, y_2$)=(0, $y_1-y_2$) IF $y_1-y_2 \leq 1\mu m$, PATTERN PB IS DEFECTIVE PATTERN
($y_1-y_2$ : ABSOLUTE VALUE)

⑦ B−C=($x_2, y_2$)−($x_3, y_3$)=($x_2-x_3$, 0) IF $x_2-x_3 \leq 1\mu m$, PATTERN PB IS DEFECTIVE PATTERN
($x_2-x_3$ : ABSOLUTE VALUE)

⑧ D−C=($x_4, y_4$)−($x_3, y_3$)=(0, $y_4-y_3$) IF $y_4-y_3 \leq 1\mu m$, PATTERN PB IS DEFECTIVE PATTERN
($y_4-y_3$ : ABSOLUTE VALUE)

⑨ D−A=($x_4, y_4$)−($x_1, y_1$)=($x_4-x_1$, 0) IF $x_4-x_1 \leq 1\mu m$, PATTERN PB IS DEFECTIVE PATTERN
($x_4-x_1$ : ABSOLUTE VALUE)

(ARBITRARY VALUE MAY BE USED, IN PLACE OF THE ABOVE-MENTIONED VALUE OF 1 $\mu m$)

METHOD AND APPARATUS FOR INSPECTING PATTERNS COMPOSED OF RETICLE DATA

BACKGROUND OF THE INVENTION

1. Field of the Invention

The present invention relates to a method and apparatus for inspecting patterns composed of reticle data which are typically used for producing various kinds of semiconductor devices etc., by detecting defects included in these patterns.

When one or a plurality of semiconductor integrated circuits in a semiconductor chip constituting each of semiconductor devices are fabricated on the basis of photolithographic techniques, e.g., an exposure technique, at least one photomask having patterns of reticle data corresponding to the integrated circuits is generally utilized for forming these patterns on the semiconductor chip.

The present invention pertains to a technique for inspecting patterns of reticle data in such a photomask, by accurately picking up any defects included in these patterns so as to obtain a photomask of high quality.

2. Description of the Related Art

Recently, the density of semiconductor integrated circuits incorporated in a given semiconductor chip has remarkably increased. Further, semiconductor integrated circuits tend to be applied to various fields, and patterns of various reticle data corresponding to these integrated circuits are also likely to be diversified. To meet the above-mentioned tendency, it is strongly required that an inspection of various kinds of patterns with relatively small dimensions and relatively high density be carried out at high speed and with high accuracy.

In a conventional technique for inspecting patterns composed of reticle data, two types of defects can be simultaneously picked up during inspection of patterns of reticle data. The first type of defects are referred to as "true defects", which inherently exist in original patterns. On the other hand, the second type of defects are referred to as "false defects", which do not exist in the original patterns. These false defects may be generated in patterns of reticle data which are arranged so that defects can be easily detected at high speed by enlarging and reducing source data corresponding to original patterns.

In other words, it is important to completely pick up all the true defect existing in the original patterns for the development of a photomask of high quality. However, the false defects inevitably occur owing to enlargement or reduction and combination of source data (usually referred to as "sizing process") and also owing to merging of patterns obtained by the sizing process (usually referred to as "slit filling process"), and are not closely related to the development of such a photomask.

Therefore, in the above-mentioned conventional technique, to distinguish the true defects and the false defects from each other, the false defects are confirmed by observing all the detected defects by visual inspection one by one. According to such a technique, it takes an extremely long time to finish confirming each of the false defects by visual inspection. Consequently, it becomes difficult to easily separate the true defects from the false defects and complete an inspection of patterns of reticle data at high speed, especially in the case of an inspection of patterns having relatively small dimensions and high density.

Here, to enable some problems regarding a conventional technique for inspecting patterns to be understood more clearly, a sequence of procedures for inspecting patterns of reticle data and an illustrative flow of a slit filling process according to the prior art will be described with reference to the related drawings of FIGS. 1 and 2.

FIG. 1 is a flowchart for explaining a method for inspecting patterns of reticle data according to the prior art.

In general, as shown in a step S100 and a step S101 of FIG. 1, plural kinds of source data have been stored in advance in file memory units, e.g., disk drives. These source data are essential for designing a given device, e.g., a semiconductor device. By adequately combining these source data with each other, basic data for designing and fabricating a desired large scale integrated circuit (e.g., a large scale integrated circuit usually abbreviated as "LSI") can be obtained.

Next, in a step S102, a sizing process is carried out, in which such basic data are enlarged or reduced, dependent on the kind of photolithographic process, e.g., an exposure technique (an exposure by using a photoresist of negative type or a photoresist of positive type), an etching technique, and the like. By executing such a sizing process, patterns composed of reticle data having dimensions adequate for fabricating the desired integrated circuit can be obtained.

The above-mentioned sizing process is sometimes referred to as an enlargement process (or + shift process) or a reduction process (or – shift process). In the case where the sizing process is carried out, especially, the reduction process is carried out, a number of slits each having an extremely narrow width are generated in patterns of reticle data. In general, it is almost impossible to form each of these slits by using a photoresist corresponding to patterns of reticle data by means of an exposure technique and an etching technique, since the slits are too narrow to be resolvable when an exposure is executed on the photoresist. A pattern corresponding to each of these slits generated during a sizing process is deemed to be a defective pattern, since the pattern does not satisfy a condition of dimensions in patterns defined by a predetermined rule.

Further, in step S103, to minimize an occurrence of a defective pattern which is not conformable to a predetermined rule, a slit filling process is carried out. A concrete procedure for executing a conventional slit filling process will be illustrated in FIG. 2. With reference to FIG. 2, the procedure for executing a slit filling process will be described hereinafter in detail.

In this case, it is assumed that some slits have been generated in original patterns 201 of reticle data that are produced by carrying out a sizing process in which plural kinds of source data are combined with each other. In FIG. 2, a given one of these slits will be illustrated representatively. Such a slit has a dimension in width which is not conformable to a predetermined rule, for example, a dimension which is equal to or smaller than 1 μm.

To remove every slit from the original patterns of reticle data, the original patterns 201 are enlarged with an adequate magnification so as to produce enlarged patterns 202. In FIG. 2, such a process for producing the enlarged patterns 202 is indicated as "enlargement process" to distinguish this process from the above-mentioned sizing process. Subsequently, a merging process is carried out for the enlarged patterns 202 to generate patterns 203 in which there is no slit.

Further, the patterns 203 having no slit are reduced to the same size as that of the original patterns 201. In FIG. 2, such a process for reducing the patterns 203 is indicated as "reduction process" to distinguish this process from the above-mentioned sizing process. By executing such reduction process, patterns 204, which do not include any slit and have the same dimensions as the original patterns 201, can be obtained. In this way, the whole procedure of the slit filling process regarding the original patterns 201 is completed. Finally, patterns of reticle data, which is to be utilized for an inspection of the original patterns, can be produced.

Here, it should be noted that narrow stringy patterns, each having a form in which a thread extends, occur in the patterns 204 obtained by the slit filling process. In general, each of the stringy patterns has a dimension in width which is not conformable to a predetermined rule, for example, a dimension which is equal to or smaller than 1 µm. These stringy patterns occur inevitably owing to such a slit filling process, not owing to true defects which inherently exist in the original patterns 201. To distinguish the above-mentioned stringy patterns from the true defect, defects related to such stringy patterns are often referred to as "false defects", as previously described.

Returning to FIG. 1, the remaining part of the flowchart from steps S104 through S106 will be described hereinafter.

As shown in the step S104 of FIG. 1, information (i.e., data) about patterns obtained by the sizing process is stored in a storage unit, e.g., disk drive, together with information about patterns obtained by the slit filling process.

Further, in a step S105, all the data stored in the storage unit is used for inspecting patterns composed of reticle data. During inspection of patterns of reticle data (i.e., reticle patterns), both the false defects and the true defects are simultaneously picked up.

Finally, in a step S106, both the false defects and the true defects, i.e., the two types of defects, are observed by visual inspection to distinguish the true defects and the false defects from each other.

As mentioned above, according to a method for inspecting patterns of reticle data in the prior art, during inspection of these patterns, both the false defects and the true defects are picked up and detected without distinguishing the two types of defects from each other. More specifically, in the prior art, a large number of false defects, which amount to one hundred through two hundred and do not exist in the original patterns, are detected, together with the true defects. Thereafter, the false defects must be confirmed by observing all the detected defects including the true defects by visual inspection one by one.

Therefore, in such a method, a problem occurs in that it takes an extremely long time to assuredly confirm all the false defects by visual inspection.

In other words, according to the prior art, it is very difficult to easily separate the true defects from the false defects and complete an inspection of patterns of reticle data at high speed.

SUMMARY OF THE INVENTION

In view of the above-described problem, the main object of the present invention is to provide a method and apparatus for inspecting patterns composed of reticle data, which enable easy separation of true defects existing in original patterns from false defects resulting from a slit filling process.

A further object of the present invention is to provide a method and apparatus for inspecting patterns composed of reticle data, which enable an accurate pick up of only true defects and completion of an inspection of original patterns at high speed.

A still further object of the present invention is to provide a method and apparatus for inspecting patterns composed of reticle data, which can be applied to patterns composed of reticle data that are used for fabricating a semiconductor device or the like.

A still further object of the present invention is to provide a method and apparatus for inspecting patterns composed of reticle data, in which these patterns can be used in the form of at least one photomask for fabricating a semiconductor device or the like.

To attain these objects, the method for inspecting patterns composed of reticle data which are used for producing a given device, according to the present invention, includes the following steps:

The first step is to carry out a sizing process in which plural kinds of source data, that have been stored in advance and are essential for designing the device, are enlarged or reduced and combined with each other to produce patterns of reticle data having dimensions adequate for fabricating the device;

The second step is to carry out a slit filling process in which any slit, that may occur in patterns obtained by the sizing process and is unconformable to a predetermined rule, is filled and deleted by enlarging and reducing the patterns related to the slit;

The third step is to store the patterns obtained by the sizing process and the patterns obtained by the slit filling process in different storage units, respectively;

The fourth step is to carry out a given logical operation for the patterns obtained by the sizing process and the patterns obtained by the slit filling process, by reading out the two kinds of patterns from the storage units;

The fifth step is to store patterns obtained by the logical operation as graphic patterns;

The sixth step is to detect patterns each having dimensions equal to or smaller than the predetermined value on the basis of coordinates of the graphic patterns; and The seventh step is to deem each of the thus detected patterns to be a pattern corresponding to each of false defects, and to determine that the pattern is an indefective pattern, and to distinguish the indefective pattern from a pattern corresponding to each of true defects which are to be detected from each of the patterns obtained by the sizing process, to pick up only the true defects during inspection of the patterns of reticle data.

Preferably, the apparatus for inspecting patterns composed of reticle data which are used for producing a given device, according to the present invention, includes:

a sizing unit for carrying out a sizing process in which plural kinds of source data essential for designing the device are enlarged or reduced and combined with each other to produce patterns of reticle data having dimensions adequate for fabricating the device;

a slit filling unit for carrying out a slit filling process in which any slit, that may occur in patterns obtained by the sizing process and is unconformable to a predetermined rule, is filled and deleted by enlarging and reducing the patterns related to the slit;

a first processed data storage unit and a second processed data storage unit which store the patterns obtained by the sizing process and the patterns obtained by the slit filling process, respectively;

a logical operation means for carrying out a given logical operation for the patterns obtained by the sizing process and the patterns obtained by the slit filling process, the two kinds of patterns being read out from the first and second storage units, respectively;

a graphic data storage unit which stores patterns obtained by the logical operation in the logical operation means as graphic patterns; and a false defect detecting unit for detecting patterns each having dimensions equal to or smaller than predetermined value on the basis of coordinates of the graphic patterns which are stored in the graphic data storage unit.

In such a configuration, the apparatus operates to deem each of patterns detected by the false defect detecting means to be a pattern corresponding to each of false defects, and to determine that the pattern is an indefective pattern. Further, the apparatus operates to distinguish the indefective pattern from a pattern corresponding to each of true defects which are to be detected from each of the patterns obtained by the sizing process, to pick up only the true defects during inspection of the patterns of reticle data.

Further, preferably, in the above-mentioned method and apparatus, the logical operation is composed of a process which enables residual patterns to be obtained by subtracting patterns obtained by the sizing process from patterns obtained by the slit filling process.

Further, preferably, the above-mentioned method and apparatus can be applied to patterns composed of reticle data which are used for producing a given semiconductor device.

Further, preferably, in the above-mentioned method and apparatus, patterns composed of reticle data can be used in the form of at least one photomask which enables a given device, e.g., a given semiconductor device to be fabricated on the basis of photo-lithography technique.

In these techniques according to the present invention, a certain logical operation for each of patterns obtained by the sizing process and each of patterns obtained by the slit filling process is executed to extract all narrow stringy patterns. For example, by subtracting each of patterns obtained by the sizing process from each of patterns obtained by the slit filling process, residual pattern corresponding to stringy patterns can be easily obtained.

Further, dimensions of the residual pattern is estimated. As a result of such an estimation, when it is confirmed that either one of the dimensions (e.g., dimension in width) is not larger than the predetermined value, the residual pattern (i.e., stringy pattern) is deemed to be a pattern corresponding to a false defect. In this way, all the false defects can be distinguished from true defects existing in the original pattern.

By virtue of the above-mentioned logical operation and the estimation of dimensions of residual patterns extracted by the logical operation, every stringy pattern corresponding to each of the false defects can be easily and accurately detected, separate from the original patterns of reticle data.

In other words, it becomes unnecessary to pick up any pattern corresponding to any of the false defects. Therefore, trouble of confirming every stringy pattern by visual inspection can be saved. Consequently, it is possible to remarkably reduce the time required for inspecting patterns of reticle data, and to complete an inspection of the patterns at high speed.

BRIEF DESCRIPTION OF THE DRAWINGS

The above objects and features of the present invention will be more apparent from the following description of some preferred embodiments with reference to the accompanying drawings, wherein:

FIG. 1 is a flowchart for explaining a method for inspecting patterns of reticle data according to the prior art;

FIG. 2 is a diagram for explaining a procedure for executing a conventional slit filling process;

FIGS. 3A and 3B are flowcharts each for explaining a fundamental embodiment of a method for inspecting patterns of reticle data based on the basic principle of the present invention;

FIG. 9 is a diagram for explaining a concrete example representing a process for detecting false defect patterns shown in FIG. 8 by using enlarged patterns;

FIG. 10 is a diagram for explaining a concrete example representing a process for detecting true defect patterns according to a preferred embodiment of the present invention by using an enlarged pattern.

DESCRIPTION OF THE PREFERRED EMBODIMENTS

Hereinafter, the description of some preferred embodiments according to the present invention will be given with reference to the accompanying drawings.

Figure 3B:
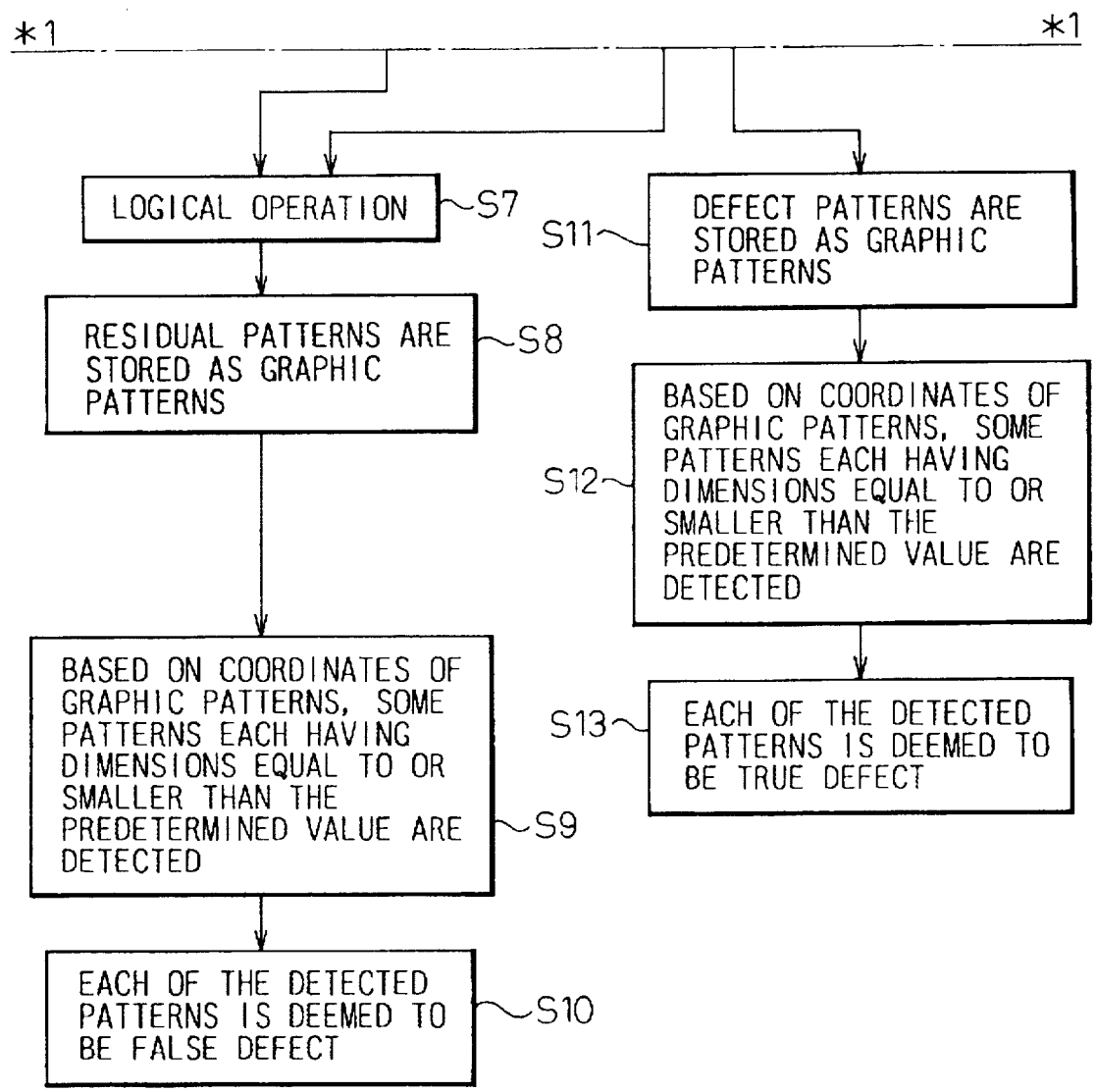

FIGS. 3A and 3B are flowcharts each for explaining a fundamental embodiment of a method for inspecting patterns of reticle data based on the basic principle of the present invention.

The method for inspecting patterns composed of reticle data according to the present invention consists of steps S1 to S6 shown in FIG. 3A, and steps S7 to S13 shown in FIG. 3B.

In steps S1 and S2 of FIG. 3A, plural kinds of source data, which are essential for designing a given device, e.g., a semiconductor device, have been stored in advance in file memory units, e.g., disk drives.

In a step S3, a sizing process is carried out, in which these source data are enlarged or reduced and combined with each other to produce patterns of reticle data having dimensions adequate for fabricating the device.

In a step S4, a slit filling process is carried out in which any slit, that may occur in patterns obtained by the sizing process and is not conformable to a predetermined rule, is filled and deleted by enlarging and reducing the patterns related to the slit.

In steps S5 and S6, the patterns obtained by the sizing process and the patterns obtained by the slit filling process are stored in different storage units.

In a step S7 of FIG. 3B, a given logical operation is carried out for the patterns obtained by the sizing process and the patterns obtained by the slit filling process, by reading out the two kinds of patterns from the storage units.

In a step S8, patterns obtained by the logical operation are stored as graphic patterns.

In a step S9, patterns each having dimensions equal to or smaller than the predetermined value on the basis of coordinates of the graphic patterns are detected.

In a step S10, each of the thus detected patterns is deemed to be a pattern corresponding to each of false defects, and it is determined that each of the patterns is an indefective pattern. Further, the indefective pattern is distinguished from patterns corresponding to true defects which are to be detected from each of the patterns obtained by the sizing process, so as to pick up only the true defects during inspection of the patterns of reticle data.

As shown in step S11, patterns related to the true defects, which are obtained after the sizing process is carried out and are stored in a storage unit, are stored as graphic patterns.

In a step S12, patterns each having dimensions equal to or smaller than the predetermined value are detected on the basis of coordinates of the graphic patterns.

In a step S13, it is determined that each of the patterns detected in step S12 is a pattern corresponding to a true defect.

It should be noted that each of the above-mentioned sizing process and the above-mentioned slit filling process also may be referred to as a logical operation in some sense.

Figure 4:
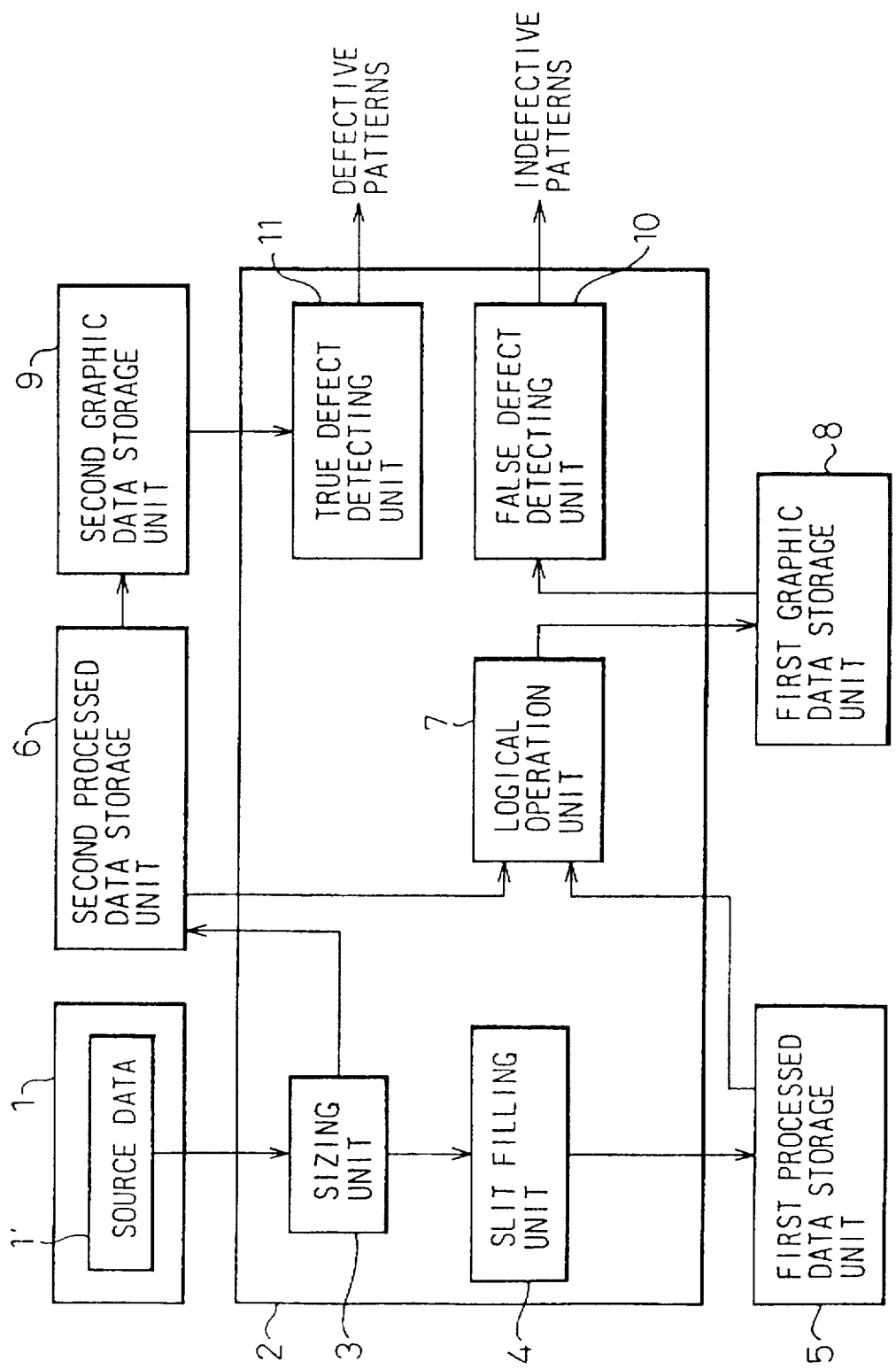
FIG. 4 is a block diagram showing a fundamental embodiment of an apparatus for inspecting patterns of reticle data based on the basic principle of the present invention.

FIG. 4 is a block diagram showing a fundamental embodiment of an apparatus for inspecting patterns of reticle data based on the basic principle of the present invention.

As shown in FIG. 4, the apparatus according to the present invention includes a data processing unit 2. The data processing unit 2 has a function of detecting false defects on the basis of patterns obtained by the slit filling process, and also a function of detecting true defects on the basis of patterns obtained by the sizing process. The two functions in the data processing unit 2 are independent of each other.

Further, in FIG. 4, plural kinds of source data 1', which are essential for designing a given device, e.g., a semiconductor device, have been stored in advance in file memory units 1, e.g., disk drives.

More specifically, in FIG. 4, the data processing unit 2 provides sizing means for carrying out the sizing process in which these source data 1' are enlarged or reduced and combined with each other to produce patterns of reticle data having dimensions adequate for fabricating a given device, e.g., a semiconductor device; and slit filling means 3 for carrying out a slit filling process in which any slit, that may occur in patterns obtained by the sizing process and is not conformable to a predetermined rule, is filled and deleted by enlarging and reducing the patterns related to the slit.

Also, as shown in FIG. 4, the apparatus according to the present invention further includes a first processed data storage unit 5 and a second processed data storage unit 6 which store patterns obtained by the sizing process and patterns obtained by the slit filling process, respectively.

Further, in FIG. 4, the data processing unit 2 provides logical operation means 7 for carrying out a given logical operation for patterns obtained by the sizing process and patterns obtained by the slit filling process. In this case, the two kinds of patterns are read out from the first and second storage units 5, 6, respectively.

Also, as shown in FIG. 4, the apparatus according to the present invention further includes a first graphic data storage unit 8 (sometimes referred to as "graphic data storage unit") which stores patterns obtained by the logical operation in the logical operation means 7 as graphic patterns.

Further, in FIG. 4, the data processing unit 2 provides false defect detecting means 10 for detecting patterns each having dimensions equal to or smaller than the predetermined value on the basis of coordinates of the graphic patterns which are stored in the graphic data storage unit 8.

Each of patterns detected by the false defect detecting means 10 is deemed to be a pattern corresponding to a false defect (sometimes referred to as "false defect pattern"), i.e., an indefective pattern. Such an indefective pattern is accurately detected, separate from a pattern corresponding to a true defect (sometimes referred to as "true defect pattern") existing in the original patterns of reticle data.

As mentioned above, patterns related to the true defects, which are obtained by the sizing process, are stored in a second data storage unit 6. When the true defects are required to be detected, these patterns related to the true defects are stored in a second graphic data storage unit 9 as graphic patterns.

Further, in true defect detecting means 11, patterns each having dimensions equal to or smaller than the predetermined value are detected on the basis of coordinates of the graphic patterns. It is determined that each of the thus detected patterns is a pattern corresponding to a true defect, i.e., a defective pattern.

In the fundamental embodiment shown in FIG. 4, a certain logical operation for each of the patterns obtained by the sizing process and each of the patterns obtained by the slit filling process is executed to extract a residual pattern corresponding to a stringy pattern.

Further, dimensions of the residual pattern are estimated. When it is confirmed that either one of the dimensions is not larger than a predetermined value defined by a predetermined rule, the residual pattern (i.e., stringy pattern) can be detected as an indefective pattern corresponding to a false defect. In this way, every indefective pattern corresponding to the false defects can be easily distinguished from any defective pattern corresponding to true defects existing in the original pattern.

Figure 5:
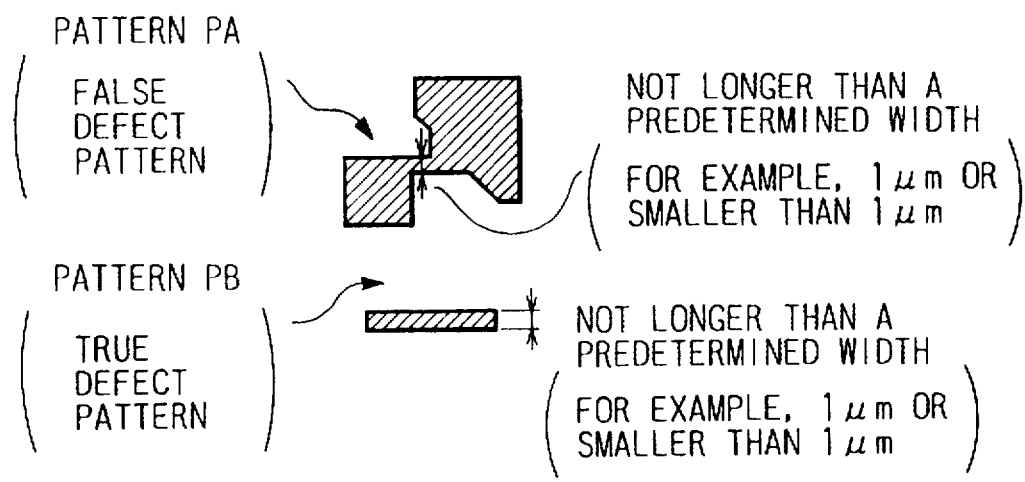
FIG. 5 is a diagram showing true defect patterns and false defect patterns which are separated from each other on the basis of the basic principle of the present invention.
Figure 6:
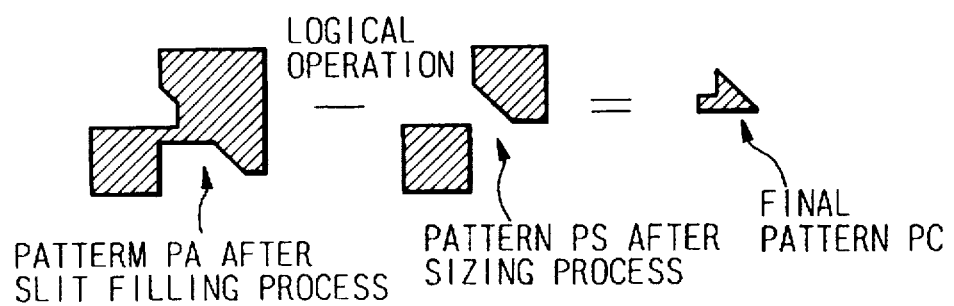
FIG. 6 is a diagram for explaining a technique for detecting false defect patterns on the basis of the basic principle of the present invention.

FIG. 5 is a diagram showing true defect patterns and false defect patterns which are separated from each other on the basis of the basic principle of the present invention; and FIG. 6 is a diagram for explaining a technique for detecting false defect patterns on the basis of the basic principle of the present invention.

In FIG. 5, an example of false defect patterns (i.e., patterns obtained by a slit filling process) and an example of true defect patterns are illustrated as a pattern PA and a pattern PB, respectively. As will be described hereinafter, these two types of defect patterns can be easily separated from each other on the basis of the basic principle of the present invention.

As shown in FIG. 5, in the pattern PA, a narrow stringy pattern, having a dimension in width which is equal to or smaller than the predetermined value (for example, a dimension which is equal to or smaller than 1 μm), is included. On the other hand, the pattern PB is defined as a pattern corresponding to one of the true defects which inherently exist in original patterns of reticle data. The pattern PB typically has the form of narrow rectangular pattern having a dimension in width which is equal to or smaller than the predetermined value (for example, a dimension which is equal to or smaller than 1 μm).

As shown in FIG. 6, by executing a given logical operation, e.g., a NOR (not-or) logical operation, each of the patterns (e.g., pattern PS) obtained by the sizing process is subtracted prom each of the patterns (e.g., pattern PA) obtained by the slit filling process. As a result, a residual pattern corresponding to the stringy pattern can be easily extracted from the pattern PA in the form of final pattern PC.

Further, dimensions of the final pattern PC are estimated. When it is confirmed that one of the dimensions, e.g., a dimension in width, is not larger than the predetermined value (for example, a dimension which is equal to or smaller than 1 μm), the final pattern PC (i.e., the residual pattern) can be detected as a false defect pattern corresponding to one of the false defects. The thus detected pattern can be easily distinguished from a true defect pattern (e.g., pattern PS) existing in each of patterns obtained by the sizing process.

By virtue of the logical operation shown in FIG. 6 and the estimation of dimensions of final pattern PC (i.e., residual pattern) extracted by the logical operation, every false defect pattern corresponding to one of the false defects can be easily and accurately detected, separate from the true defect pattern (e.g., pattern PS) existing in the original patterns of reticle data. Therefore, trouble of observing and confirming every false defect pattern by visual inspection can be saved. Thus, it is possible to remarkably reduce time required for inspecting the original patterns of reticle data.

In other words, according to the technique for detecting false defect patterns shown in FIGS. 5 and 6, false defect patterns obtained by a slit filling process and true defect patterns existing in the original patterns can be easily separated from each other. Accordingly, the residual patterns obtained by the logical operation shown in FIG. 6 can be examined and detected, separate from the true defect patterns existing in the patterns obtained by the sizing process.

In such a technique, it is unnecessary to pick up the false defect patterns, together with the true defect patterns. Therefore, it is possible to remarkably reduce time required for inspecting the original patterns of reticle data, and to complete an inspection of the patterns at high speed.

Figure 7:
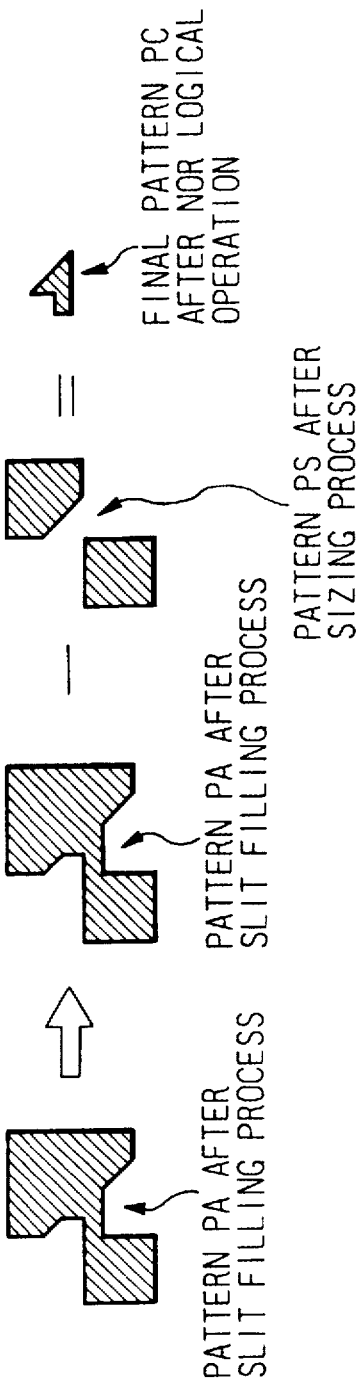
FIG. 7 is a diagram for explaining a logical operation in a method for inspecting patterns of reticle data according to a preferred embodiment of the present invention.

FIG. 7 is a diagram for explaining a flowchart for explaining a logical operation in a method for inspecting patterns of reticle data according to a preferred embodiment of the present invention. Hereinafter, any component which is the same as that mentioned before will be referred to using the same reference numeral.

In the preferred embodiment shown in FIG. 7, as concrete example of patterns composed of reticle data which are to be inspected, patterns of reticle data that are used for producing a given semiconductor devices will be selected. Further, it is assumed that the patterns composed of reticle data are used in the form of at least one photomask which enables semiconductor integrated circuits in the semiconductor device to be fabricated on the basis of photo-lithography technique.

In a portion (a) of FIG. 7, similar to the upper part of FIG. 5, a pattern PA is illustrated as an example of patterns obtained by a slit filling process.

More specifically, as described in step S3 of FIG. 3A, a pattern PS is produced by carrying out an adequate sizing process in accordance with an exposure method in fabricating semiconductor integrated circuits in the semiconductor device. Subsequently, as described in step S4 of FIG. 3A, the pattern PA is produced after the slit filling process is carried out by enlarging and reducing the patterns related to at least one slit that may occur due to the sizing process. It should be noted that a narrow stringy pattern is generated in the pattern PA.

In a portion (b) of FIG. 7, similar to FIG. 6, the pattern PS obtained by the sizing process is subtracted from the pattern PA obtained by the slit filling process. Preferably, such a subtraction is carried out by executing a NOR logical operation (i.e., negative logical sum) for the pattern PS and the pattern PA. As a result, a residual pattern corresponding to the stringy pattern can be easily extracted from the pattern PA in the form of final pattern PC. As apparent from the portion (b) of FIG. 7, the final pattern PC obtained by the NOR logical operation corresponds to a false defect pattern which has occurred due to the slit filling process. Namely, the final pattern PC does not exist in the original pattern of reticle data, only the pattern PS obtained by the sizing process.

In the above-mentioned embodiment of the present invention, by utilizing a relatively simple logical operation, e.g., NOR logical operation, the final pattern PC corresponding to a false defect pattern, which has occurred due to the slit filling process, can be easily separated from a true defect pattern existing in the original pattern of reticle data.

Further, as will be described hereinafter, dimensions of the final pattern PC, which is separated from the true defect pattern, can be rapidly and accurately estimated on the basis of coordinates of graphic patterns.

Figure 8:
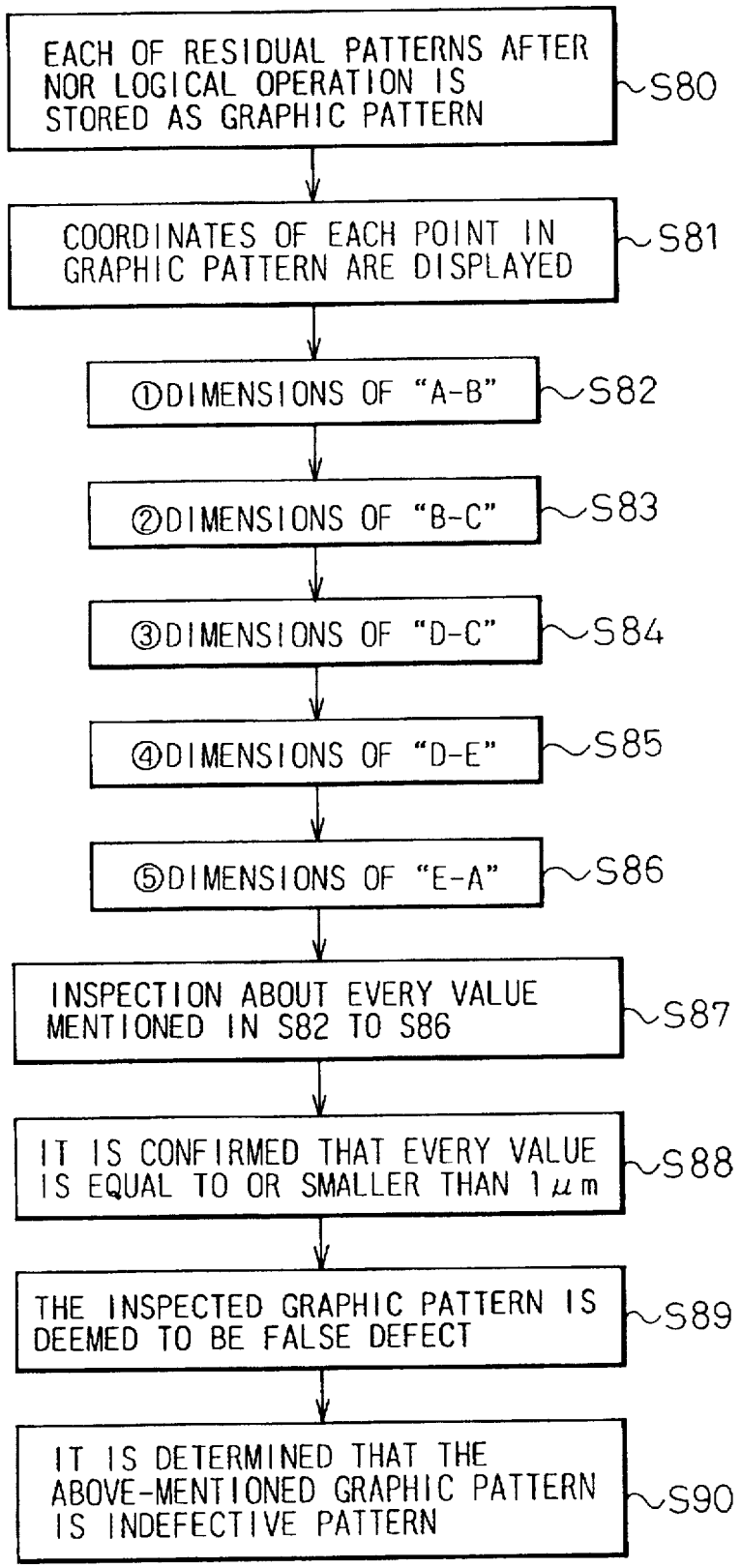
FIG. 8 is a flowchart for explaining a process for detecting false defect patterns according to a preferred embodiment of the present invention.

FIG. 8 is a flowchart for explaining a process for detecting false defect patterns according to a preferred embodiment of the present invention; FIG. 9 is a diagram for explaining a concrete example representing a process for detecting false defect patterns shown in FIG. 8 by using enlarged patterns; and FIG. 10 is a diagram for explaining a concrete example representing a process for detecting true defect patterns by using an enlarged pattern.

In the flowchart (step S80 to S90) shown in FIG. 8, a part of the process for detecting false defect patterns, which corresponds to steps S8 to S10 in FIG. 3B, is illustrated in detail.

In a step S80 of FIG. 8, each of residual patterns, e.g., final pattern PC (shown in FIG. 7) obtained by a NOR logical operation is stored in a graphic data storage unit etc., as a graphic pattern.

Next, in a step S81, coordinates of each point in the thus stored graphic pattern are displayed in a display unit or the like. Namely, in this case, coordinates of each point in each of the false defect patterns are displayed.

As shown in enlarged patterns in FIG. 9, coordinates (e.g., x–y coordinates), corresponding to a plurality of representative points in each of the false defect patterns (e.g., final pattern PC), are indicated as A ($x_1$, $y_1$), B ($x_2$, $y_2$), C ($x_3$, $y_3$), D ($x_4$, $y_4$) and E ($x_5$, $y_5$), respectively. Further, a triangular portion including two points of C ($x_3$, $y_3$) and D ($x_4$, $y_4$), which is illustrated in FIG. 9 in the form of pattern PD, is extracted from the pattern PC. Dimensions of three sides in a triangle constituted by the pattern PD are defined as X, Y and Z, respectively. Namely, a dimension of an oblique line among the three sides is defined as X. The dimension X corresponds to a dimension in width between the point C ($x_3$, $y_3$) and the point D ($x_4$, $y_4$).

Based on the above-mentioned points A ($x_1$, $y_1$), B ($x_2$, $y_2$), C ($x_3$, $y_3$), D ($x_4$, $y_4$), and E ($x_5$, $y_5$), dimensions in width (or length) are represented by the following equations ① to ⑤.

$$A-B=(x_1,y_1)-(x_2,y_2)=(0,y_1-y_2) \qquad ①$$

$$B-C=(x_2,y_2)-(x_3,y_3)=(x_2-x_3,0) \qquad ②$$

$$D-C=[(y_4-y_3)^2+(x_4-x_3)^2]^{1/2}=x \qquad ③$$

$$D-E=(x_4,y_4)-(x_5,y_5)=(0,y_4-y_5) \qquad ④$$

$$E-A=(x_5,y_5)-(x_1,y_1)=(x_5-x_1,0) \qquad ⑤$$

Returning to FIG. 8, the remaining part of the flowchart from steps S82 through S90 will be described hereinafter.

As shown in steps S82 to S86, dimensions in width (or length) of "A–B", "B–C", "D–C", "D–E" and "E–A" as represented by the equations ①  to ⑤ are automatically calculated by using a CPU (Central Processing Unit) of computers or the like.

Further, in steps S87 and S88, an inspection of the calculated value obtained in steps S82 to S86 is carried out. With regard to every calculated value by using the equations ① to ⑤, it is checked whether or not the calculated value is unconformable to a predetermined rule in designing a semiconductor device etc. More specically, it is confirmed that each of the dimensions of "A–B", "B–C", "D–C", "D–E" and "E–A" is equal to or smaller than the reference value defined by the predetermined rule, for example, a dimension which is equal to or smaller than 1 µm. In general, the reference value is defined as a minimum dimension in width which is resolvable when an exposure is executed.

In a step S89, when any one of the dimensions of "A–B", "B–C", "D–C", "D–E" and "E–A" is equal to or smaller than 1 µm, the final pattern PC (residual pattern) is deemed to be a false defect pattern corresponding to one of the false defects generated by the slit filling process. Further, in a step S90, it is determined that the above-mentioned graphic pattern is an indefective pattern which must be separated from true defect patterns.

For comparison with the false defect patterns (e.g., final pattern PC) described in FIG. 9, an example of the true defect patterns is illustrated in FIG. 10 by using an enlarged pattern. In this case, each of the true defect patterns is stored in another graphic data storage unit, which is provided separate from the graphic data storage unit for storing each of the false defect patterns, as each graphic pattern.

As shown in the enlarged pattern in FIG. 10, coordinates (e.g., x–y coordinates), corresponding to representative points corresponding to four corners in each of the true defect patterns (e.g., pattern PB obtained by the sizing process), are indicated as A $(x_1, y_1)$, B $(x_2, y_2)$, C $(x_3, y_3)$ and D $(x_4, y_4)$, respectively. The four points A $(x_1, y_1)$, B $(x_2, y_2)$, C $(x_3, y_3)$ and D $(x_4, y_4)$ indicate four corners in the pattern PB having the narrow rectangular form.

Based on the above-mentioned points A $(x_1, y_1)$, B $(x_2, y_2)$, C $(x_3, y_3)$ and D $(x_4, y_4)$, dimensions in width (or length) are represented by the following equations ⑥ to ⑨.

$$A-B=(x_1,y_1)-(x_2,y_2)=(0,y_1-y_2) \qquad ⑥$$

$$B-C=(x_2,y_2)-(x_3,y_3)=(x_2-x_3,0) \qquad ⑦$$

$$D-C=(x_4,y_4)-(x_3,y_3)=(0,y_4-y_3) \qquad ⑧$$

$$D-A=(x_4,y_4)-(x_1,y_1)=(x_4-x_1,0) \qquad ⑨$$

Dimensions in width (or length) of "A–B", "B–C", "D–C" and "D–A" as represented by the equations ⑥ to ⑨ are automatically calculated by using a CPU of computers or the like.

Further, an inspection of every value calculated by the equations ⑥ to ⑨ is carried out. It is checked whether or not the calculated value is unconformable to a predetermined rule in designing a semiconductor device etc. More specifically, it is confirmed that each of the dimensions of "A–B", "B–C", "D–C" and "D–A" is equal to or smaller than the reference value defined by the predetermined rule, for example, a dimension which is equal to or smaller than 1 µm. Also, in this case, the reference value is defined as a minimum dimension in width which is resolvable when an exposure is executed.

When any one of the dimensions of "A–B", "B–C", "D–C" and "D–A" is equal to or smaller than 1 µm, the final pattern PC (residual pattern) is deemed to be a true defect pattern corresponding to each of true defects inherently existing in patterns obtained by the sizing process, i.e., original patterns of reticle data.

Here, all the false defect patterns previously detected are stored in advance in a data storage unit before an inspection of patterns obtained by the sizing process is started. Further, when the inspection of patterns obtained by the sizing process is executed, a CPU of computers operates not to pick up the false defect patterns on the basis of the data stored in the data storage unit. In this way, the false defect patterns can be separated from the true defect patterns which must be detected during inspection of patterns of reticle data. In this case, trouble of observing and confirming all the false defect patterns by visual inspection can be saved. Therefore, it is possible to remarkably reduce the time required for inspecting the original patterns.

Further, it is not always necessary for a minimum dimension in width of each slit defined by a predetermined rule to be limited to 1 µm. The minimum dimension of the slit may be set to an arbitrary value, for example 0.8 µm, dependent on an exposure method, a resolution of an exposure apparatus, and the like.

Figure 11:
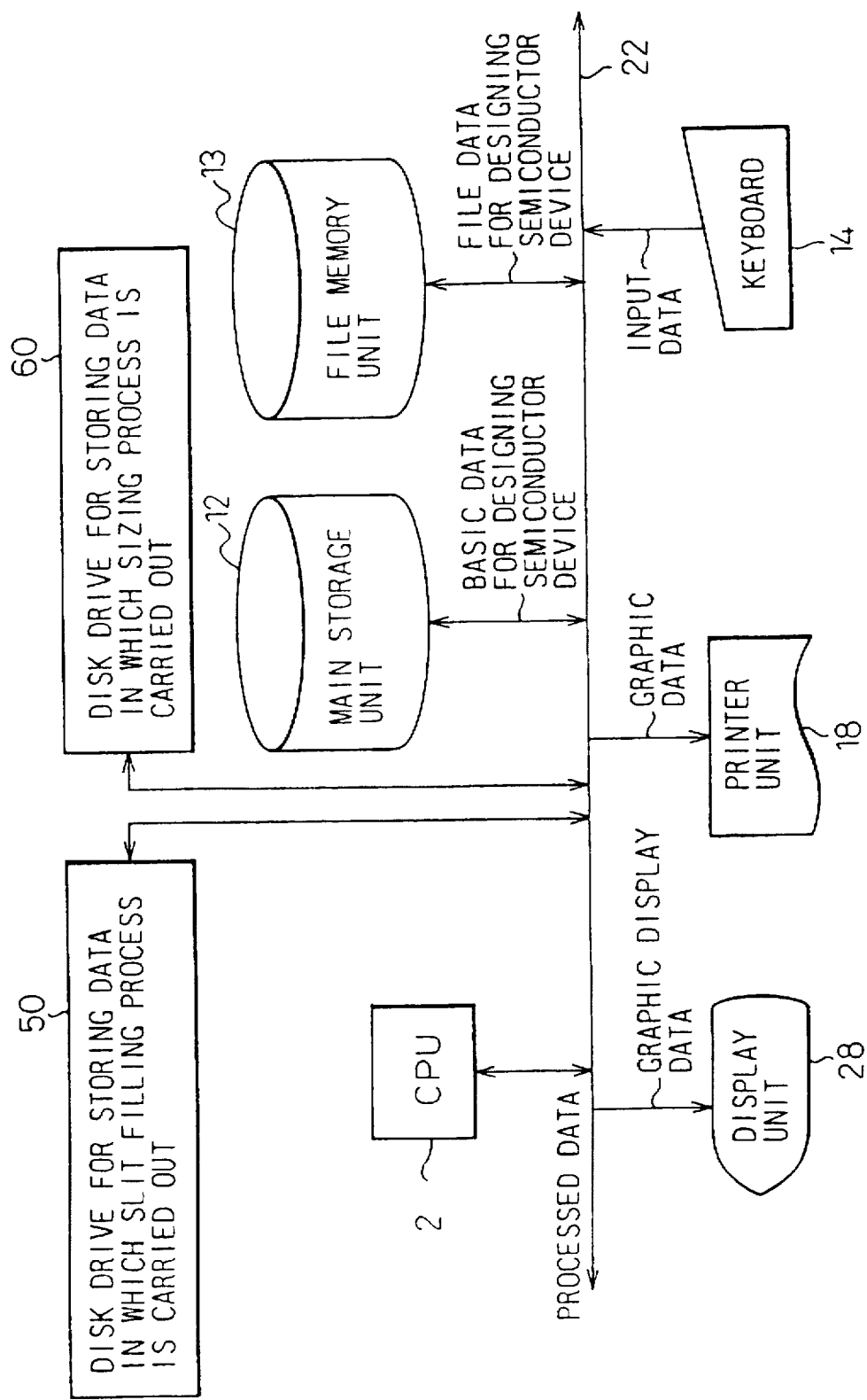
FIG. 11 is a block diagram showing an apparatus for inspecting patterns of reticle data according to a preferred embodiment of the present invention.

FIG. 11 is a block diagram showing an apparatus for inspecting patterns of reticle data according to a preferred embodiment of the present invention. In FIG. 11, a system configuration, for easily realizing the apparatus for inspecting patterns of reticle data shown in FIG. 4, is illustrated.

In the system configuration of FIG. 11, the data processing unit 2, which has a function of detecting false defect patterns and a function of true defect patterns, is constituted by a CPU 20 of computers or the like.

Further, in FIG. 11, the apparatus for inspecting patterns of reticle data includes a system bus 22 which transfers commands sent from the CPU 20 and processed data for producing various semiconductor devices. Further, a file memory unit 13 (e.g., disk drive) and a main storage unit 12 (e.g., semiconductor memory unit) are connected to the system bus 22. Further, a keyboard 14 for inputting various data, a printer unit 18 for printing graphic data about graphic patterns, and a display unit 28 are also connected to the system bus 22. The display unit 28 operates to display graphic patterns necessary for an inspection of patterns of reticle data, on the basis of graphic data about graphic patterns representing false defect patterns and true defect patterns.

Further, in FIG. 11, plural kinds of source data, which are essential for designing a given device, e.g., a semiconductor device, have been stored in advance in the file memory unit 13 and the main storage unit 12. The file memory unit 13 stores file data for designing a semiconductor device. On the other hand, the main storage unit 12 stores basic data for designing a semiconductor device, which are used with relatively high frequency of usage. If these source data are adequately combined with each other by operating a keyboard 14 or the like, it is possible to produce patterns of reticle data adequate for fabricating a desired semiconductor device.

Further, in FIG. 11, the apparatus for inspecting patterns of reticle data includes a disk drive 50 for storing data in which the slit filling process is carried out; and a disk drive 60 for storing data in which the sizing process is carried out. These two disk drives 50, 60 are provided separate from each other.

In the prior art, the false defect patterns and the true defect patterns are simultaneously picked up. On the other hand, according to the system configuration shown in FIG. 11, the true defect patterns can be accurately detected, separate from the false defect patterns. When all the false defect patterns are detected, it is preferable to store in advance these false defect patterns in the disk drive 50 before an inspection of patterns obtained by the sizing process is started. Further, when the inspection of patterns obtained by the sizing process is executed, the CPU 20 controls the system not to pick up the false defect patterns on the basis of the data stored in the disk drive 50.

In the preferred embodiment shown in FIG. 11, it becomes possible to separate the false defect patterns from the true defect patterns with a relatively simple configuration. Therefore, trouble of observing and confirming all the false defect patterns by visual inspection can be saved with lower cost of production. Time required for inspecting the original patterns can be remarkably reduced. Consequently, it is possible to remarkably reduce time required for inspecting the original patterns of reticle data, and to complete an inspection of the patterns at high speed.

While the present invention has been described as related to the preferred embodiments, it will be understood that various changes and modifications may be made without departing from the spirit and the scope of the invention as hereinafter claimed.

We claim:

1. A method for inspecting patterns composed of reticle data used for producing a given device, by detecting defects inherently existing in the patterns, while automatically separating false defects from the defects included in the patterns, said method comprising:

carrying out a sizing process in which plural kinds of source data, stored in advance and essential for designing the given device, are modified in size and combined to produce reticle data patterns having dimensions adequate for fabricating the given device;

carrying out a slit filling process to fill and delete any slit, resulting from said sizing process and unconformable to a predetermined rule, by enlarging by a size factor, merging the source data related to the slit to produce slit-less patterns and reducing the slit-less patterns by the size factor;

storing the reticle data patterns obtained by said sizing process and the slit-less patterns obtained by said slit filling process in different storage units, respectively;

carrying out a given logical operation for the reticle data patterns and the slit-less patterns, by reading out the reticle data and slit-less patterns from the different storage units to produce residual patterns by subtracting the reticle data patterns from the slit-less patterns;

storing the residual patterns obtained by said logical operation as graphic patterns;

detecting indefective patterns each having dimensions equal to or smaller than a predetermined value based on coordinates of the graphic patterns; and distinguishing the indefective patterns in the reticle data patterns, so that only true defects are detected during subsequent inspection of the reticle data patterns.

2. A method as set forth in claim 1, wherein said method for inspecting said patterns is applied to patterns composed of reticle data which are used for producing a given semiconductor device.

3. A method as set forth in claim 1, wherein said patterns composed of reticle data are used in the form of at least one photomask which enables said device to be fabricated on the basis of photo-lithography technique.

4. A method as set forth in claim 2, wherein said patterns composed of reticle data are used in the form of at least one photomask which enable said device to be fabricated on the basis of photo-lithography technique.

5. An apparatus for inspecting patterns composed of reticle data used for producing a given device, by detecting defects inherently existing in the patterns, while automatically separating false defects from the defects included in the patterns, said method comprising:

sizing means for carrying out a sizing process in which plural kinds of source data essential for designing the given device are modified in size and combined to produce reticle data patterns having dimensions adequate for fabricating the given device;

slit filling means for carrying out a slit filling process to fill any slit, resulting from said sizing process and unconformable to a predetermined rule, by enlarging by the size factor, merging the source data related to the slit to produce slit-less patterns and reducing the slit-less patterns by the size factor;

a first processed data storage unit and a second processed data storage unit to store the reticle data patterns and the slit-less patterns obtained by said slit filling process, respectively;

logical operation means for carrying out a given logical operation on the reticle data patterns and the slit-less patterns read out from said first and second processed data storage units, respectively, to produce residual patterns by subtracting the reticle data patterns from the slit-less patterns;

a graphic data storage unit to store the residual patterns obtained by said logical operation means as graphic patterns;

false defect detecting means for detecting indefective patterns each having dimensions equal to or smaller than a predetermined value based on coordinates of the graphic patterns stored in said graphic data storage unit; and means for distinguishing the indefective patterns in the reticle data patterns, so that only true defects are detected during subsequent inspection of the reticle data patterns.

6. An apparatus as set forth in claim 5, wherein said method inspecting said patterns is applied to patterns composed of reticle data which are used for producing a given semiconductor device.

7. An apparatus as set forth in claim 5, wherein said patterns composed of reticle data are used in the form of at least one photomask which enables said device to be fabricated on the basis of photo-lithography technique.

8. An apparatus as set forth in claim 6, wherein said patterns composed of reticle data are used in the form of at least one photomask which enables said device to be fabricated on the basis of photo-lithography technique.

* * * * *

UNITED STATES PATENT AND TRADEMARK OFFICE
CERTIFICATE OF CORRECTION

PATENT NO.: 5,781,656
DATED : July 14, 1998
INVENTOR(S): Ichiro HAGINO et al.

It is certified that error appears in the above-identified patent and that said Letters Patent is hereby corrected as shown below:

Title Page, Abstract, line 9, change "filing" to --filling--.

Col. 5, line 5, after "smaller than" insert --a--;
line 36, change "pattern" to --patterns.

Col. 8, line 64, change "prom" to --from--.

Col. 11, line 11, change "specically" to --specifically--.

Col. 14, line 7, change "enable" to --enables--.

Signed and Sealed this

Twenty-third Day of February, 1999

Attest:

Q. TODD DICKINSON

Attesting Officer

Acting Commissioner of Patents and Trademarks